United States Patent
Scheid et al.

(10) Patent No.: US 6,268,270 B1
(45) Date of Patent: Jul. 31, 2001

(54) LOT-TO-LOT RAPID THERMAL PROCESSING (RTP) CHAMBER PREHEAT OPTIMIZATION

(75) Inventors: Glen W. Scheid, Gresham, OR (US); Terrence J. Riley; Qingsu Wang, both of Austin, TX (US); Michael Miller, Cedar Park, TX (US); Si-Zhao J. Qin, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/429,790

(22) Filed: Oct. 29, 1999

Related U.S. Application Data
(60) Provisional application No. 60/132,019, filed on Apr. 30, 1999.

(51) Int. Cl.$^7$ .................................................. H01C 21/265
(52) U.S. Cl. .................... 438/522; 438/522; 438/518; 438/514; 438/308; 438/509; 438/540; 432/93
(58) Field of Search ....................................... 438/522, 518, 438/514, 308, 509, 540; 432/93; 73/863.11

(56) References Cited

U.S. PATENT DOCUMENTS 5,624,590 * 4/1997 Fiory ..................................... 219/390
5,848,842 * 12/1998 Peuse et al. .............................. 374/1

OTHER PUBLICATIONS

Stanley Wolf and Richard N. Tauber; *Silicon Processing for the VLSI Era*; vol. 1: *Process Technology*; pp. 57–59 and 306–307; 1986.

S. Abedrabbo et al.; Issues in Emissivity of Silicon–Rapid Thermal and Integrated Processing VII; Materials Research Society Symposium Proceedings; vol. 525; pp. 95–101; 1998.

S. Adivikolanu et al.; Internal Model Control Approach to Run–to–Run Control for Semiconductor Manufacturing; Proceedings of the 1997 American Control Conference; vol. 1; pp. 145–149; Jun. 1997.

J.S. Baras et al.; A Framework for Robust Run by Run Control with Lot Delayed Measurements; IEEE Transactions on Semiconductor Manufacturing; vol. 10, No. 1; pp. 75–83; Feb. 1997.

R. Bremensdorfer et al.; Pattern Related Non–Uniformities During Rapid Thermal Processing; Materials Research Society Symposium Proceedings; vol. 429; pp. 327–333; 1996.

J. Chang et al.; Influence of Pyrometer Signal Absorption due to Process Gas on Temperature Control in Rapid Thermal Processing; SPIE Proceedings; vol. 1595; pp. 35–38; Sep. 1991.

E. Del Castillo; A Multivariate Self–Tuning Controller for Run–to–Run Process Control Under Shift and Trend Disturbances; IIE Transactions; vol. 28; pp. 1011–1021; 1996.

(List continued on next page.)

*Primary Examiner*—Matthew Smith
*Assistant Examiner*—Granvill Lee
(74) *Attorney, Agent, or Firm*—Timothy M. Honeycutt

(57) ABSTRACT

Methods of optimizing a preheat recipe for rapid thermal processing workpieces are provided. In one aspect, a method of manufacturing is provided that includes preheating a rapid thermal processing chamber according to a preheating recipe and processing a first plurality of workpieces in the rapid thermal processing chamber. Parameter measurements are performed on a first workpiece and a second workpiece of the first plurality of workpieces. The parameter measurements are indicative of processing differences between the first and second workpieces. An output signal is formed corresponding to the parameter measurements and a control signal based on the output signal is used to adjust the preheating recipe for preheating the rapid thermal processing chamber for processing a second plurality of workpieces in the rapid thermal processing chamber to reduce processing differences between first and second workpieces of the second plurality of workpieces.

25 Claims, 12 Drawing Sheets

OTHER PUBLICATIONS

E. Del Castillo et al.; An Adaptive Run–to–Run Optimizing for Linear and Nonlinear Semiconductor Processes; IEEE Transactions on Semiconductor Manufacturing; vol. 11, No. 2; pp. 285–295; May 1998.

R.B. Fair; Manufacturing Equipment Issues in Rapid Thermal Processing: *Science and Technology*; pp. 349–423; 1993.

M. Hankinson et al.; Integrated Real–Time and Run–to–Run Control of Etch Depth in Reactive Ion Etching; IEEE Transactions on Semiconductor Manufacturing; vol. 10, No. 1; pp. 121–130; Feb. 1997.

S. Leang et al.; A Control System for Photolithographic Sequences; IEEE Transactions on Semiconductor Manufacturing; vol. 9, No. 2; pp. 191–207; 1996.

B. Lojek; Rapid Thermal Processing of Semiconductors 1963–1993–Where to From Here?; RTP '93 Conference Proceedings; pp. 2–11; Sep. 1993.

M.L. Miller et al.; Monitoring of a RTA process using Multi–PCA; SPIE–The International Society for Optical Engineering; vol. 3507; pp. 87–93; 1998.

J. Moyne et al.; A run–to–run control framework for VLSI manufacturing; Proceedings of SPIE–The International Society for Optical Engineering; vol. 2091; pp. 379–390; 1994.

J.A. Mullins et al.; An Evaluation of Model Predictive Control in Run to Run Processing in Semiconductor Manufacturing; Proceedings of SPIE–The International Society for Optical Engineering; vol. 3213; pp. 182–189; 1997.

J. Musacchio et al.; On the Utility of Run to Run Control in Semiconductor Manufacturing; IEEE International Symposium on Semiconductor Manufacturing Conference Proceedings; pp. D–9–D–12; 1997.

Z. Ning et al.; A Comparative Analysis of Run–to–Run Control Algorithms in the Semiconductor Manufacturing Industry; IEEE/SEMI Advanced Semiconductor Manufacturing Conference; pp. 375–381; 1996.

P.J. O'Sullivan et al.; Using UPM for Real–Time Multivariate Modeling of Semiconductor Manufacturing Equipment; SEMATECH APC/AEC Workshop VII; pp. 1–18; Nov. 1995.

T.J. Riley et al.; Optimization of the AST Hot Liner™ for Sub–Micron Production; Material Research Society Symposium Proceedings; vol. 470; pp. 35–41; 1997.

F. Roozeboom; Advances in Rapid Thermal and Integrated Processing; pp. 5–34; 1996.

E. Sachs et al.; Run by Run Process Control: Combining SPC and Feedback Control; IEEE Transactions on Semiconductor Manufacturing; vol. 8, No. 1; pp. 26–43; Feb. 1995.

G. W. Scheid et al.; Fault Detection on a Rapid Thermal Processor: False Alarms Due to Previously Misprocessed Wafers; RTP '99 Conference Proceedings; all pages; 1999.

S. W. Butler et al.; Application of Predictor Corrector Control to Polysilicon Gate Etching; Proceedings of the 1993 American Control Conference; vol. 3; pp. 3003–3007; Jun. 1993.

H.–J. Timme et al.; Process Repeatability in Open Loop Rapid Thermal Processing; $2^{nd}$ International RTP '94 Conference Proceedings; pp. 314–320; Sep. 1994.

T. Vincent et al.; An Extended Kalman Filtering–Based Method of Processing Reflectometry Data for Fast In–Situ Etch Rate Measurements; IEEE Transactions on Semiconductor Manufacturing; vol. 10, No. 1; pp. 42–51; Feb. 1997.

J. Wagner et al.; Temperature Measurement at RTP Facilities–An Overview; Materials Research Society Symposium Proceedings; vol. 429; pp. 303–308; Apr. 1996.

E. Zafiriou et al.; Optimal Control of Semi–Batch Processes in the Presence of Modeling Error; Proceedings of the 1990 American Control Conference; vol. 2; pp. 1644–1649; May 1990.

E. Zafiriou et al.; Optimal Feed Rate Profile Determination for Fed–Batch Fermentations in the Presence of Model–Plant Mismatch; Proceedings of the 1989 American Control Conference; vol. 3; pp. 2006–2009; Jun. 1989.

E. Zafiriou et al.; An Approach to Run–to–Run Control for Rapid Thermal Processing; Proceeding of the 1995 American Control Conference; vol. 2; pp. 1286–1288; 1995.

J.L. Zhou et al.; User's Guide for FSQP; all pages; 1990.

Stanley Wolf and Richard N. Tauber, *Silicon Processing for the VLSI Era*, vol. 1—Process Technology, 57–59 and 306–307, 1986, U.S.

S. Abedrabbo et al., *Issues in Emissivity of Silicon–Rapid Thermal and Integrated Processing VII*, 95–101, 1998, U.S.

S. Adivikolanu et al., *Internal Model Control Approach to Run–to–Run Control for Semiconductor*, 145–149, 1997, U.S.

J.S. Baras et al., *A Framework for Robust Run by Run Control with Lot Delayed Measurements*, 75–83, 1997, U.S.

R. Bremensdorfer et al., *Pattern Related Non–Uniformities During Rapid Thermal Processing*, 327–333, 1996, U.S.

J. Chang et al., *Influence of Pyrometer Signal Absorption due to Process Gas on Temperature Control in Rapid Thermal Processing*, 35–38, 1991, U.S.

E. Del Castillo, *A multivariate self–tuning controller for run–to–run process control under shift and trend disturbances*, 1011–1021, 1996, U.S.

E. Del Castillo et al., *An Adaptive Run–to–Run Optimizing Controller for Linear and Nonlinear Semiconductor Processes*, 285–295, 1998, U.S.

R.B. Fair, *Rapid Thermal Processing: Science and Technology*, 349–423, 1993, U.S.

M. Hankinson et al., *Integrated Real–Time and Run–to–Run Control of Etch Depth in Reactive Ion Etching*, 121–130, 1997, U.S.

S. Leang et al., *A Control System for Photolithographic Sequences*, 191–207, 1996, U.S.

B. Lojek, *Rapid Thermal Processing of Semiconductors 1963–1993–Where to From Here?*, 2–11, 1993, U.S.

M.L. Miller et al., *Monitoring of a RTA process using Multi–PCA*, 87–93, 1998, U.S.

J. Moyne et al., *A run–to–run control framework for VLSI manufacturing*, 379–390, 1994, U.S.

J.A. Mullins et al., *An Evaluation of Model Predictive Control in Run to Run Processing in Semiconductor Manufacturing*, 182–189, 1997, U.S.

J. Musacchio et al., *On the Utility of Run to Run Control in Semiconductor Manufacturing*, D–9–D–12, 1997, U.S.

Z. Ning et al., *A Comparative Analysis of Run–to–Run Control Algorithms in the Semiconductor Manufacturing Industry*, 375–381, 1996, U.S.

P.J. O'Sullivan et al., *Using UPM for Real–Time Multivariate Modeling of Semiconductor Manufacturing Equipment*, 1–18, 1995, U.S.

T.J. Riley et al., *Optimization of the AST Hot Liner™ for Sub–Micron Production*, 35–41, 1997, U.S.

F. Roozeboom, *Advances in Rapid Thermal and Integrated Processing*, 5–34, 1996, U.S.

E. Sachs et al., *Run by Run Process Control: Combining SPC and Feedback Control*, 26–43, 1995, U.S.

G.W. Scheid et al., *Fault detection on a rapid thermal processor: false alarms due to previously misprocessed wafers*, all, 1999, U.S.

S.W. Butler et al., *Application of Predictor Corrector Control to Polysilicon Gate Etching*, 3003–3007, 1993, U.S.

H.–J. Timme et al., *Process repeatability in open loop rapid thermal processing*, 314–320, 1994, U.S.

T. Vincent et al., *An Extended Kalman Filtering–Based Method of Processing Reflectometry Data for Fast In–Situ Etch Rate Measurements*, 42–51, 1997, U.S.

J. Wagner et al., *Temperature Measurement at RTP Facilities–An Overview*, 303–308, 1996, U.S.

E. Zafiriou et al., *Optimal Control of Semi–Batch Processes in the Presence of Modeling Error*, 1644–1649, 1990, U.S.

E. Zafiriou et al., *Optimal Feed Rate Profile Determination for Fed–Batch Fermentations in the Presence of Model–Plant Mismatch*, 2006–2009, 1989, U.S.

E. Zafiriou et al., *An Approach to Run–to–Run Control for Rapid Thermal Processing*, 1286–1288, 1995, U.S.

J.L. Zhou et al., *User's Guide for FSQP*, all, 1990, U.S.

\* cited by examiner

LOT-TO-LOT RAPID THERMAL PROCESSING (RTP) CHAMBER PREHEAT OPTIMIZATION

This application claims the benefit of U.S. Provisional Application No. 60/132,019, filed Apr. 30, 1999.

BACKGROUND OF THE INVENTION

1. Field of the Invention

This invention relates generally to semiconductor fabrication technology, and more particularly to a method for optimizing semiconductor processing.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g. transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput accuracy, stability and repeatability, processing temperatures, mechanical tool parameters, and the like. This variability manifests itself as within-run disparities, run-to-run disparities and tool-to-tool disparities that can propagate into deviations in product quality and performance. An ideal monitoring and diagnostics system for such tools would provide a means of monitoring this variability, as well as providing means for optimizing control of critical parameters.

Among the parameters that would be useful to monitor and control are the temperatures and lamp power levels that silicon wafers are exposed to during rapid thermal processing (RTP) used to activate dopant implants, for example. An RTP chamber heats up during successive wafer processing so that the thermal environment experienced by early wafers will be different from the thermal environment experienced by later wafers. For example, if the RTP chamber is not preheated, the first wafers will be run in a colder RTP chamber than later wafers. This will cause differences in wafer processing within a lot of wafers, leading to decreased satisfactory wafer throughput, decreased reliability, decreased precision and decreased accuracy in the semiconductor manufacturing.

Sub-optimal preheating may also be problematic. For example, a manufacturer of rapid thermal annealing (RTA) tool provides a quartz tube temperature reading to the tool user to better understand the process conditions, and states that by preheating the tool (with a recipe similar to the production recipe) to a set tube temperature, the tube temperature traces from the $1^{st}$ workpiece can be made to overlap the $2^{nd}$ through $25^{th}$ workpieces, and, thus the system is properly preheated. From experiments and data we have produced, this preheat was found to be insufficient and sub-optimal. The $1^{st}$ workpiece was receiving more of an anneal (a higher temperature due to a higher amount of incident lamp radiation) than the rest of the lot (a "$1^{st}$ workpiece effect"). This again will cause differences in wafer processing within a lot of wafers, leading to decreased wafer reliability and decreased processing precision and accuracy.

The present invention is directed to overcoming or reducing the effects of one or more of the foregoing disadvantages.

SUMMARY OF THE INVENTION

In accordance with one aspect of the present invention, a method of manufacturing is provided that includes preheating a rapid thermal processing chamber according to a preheating recipe and processing a first plurality of workpieces in the rapid thermal processing chamber. Parameter measurements are performed on a first workpiece and a second workpiece of the first plurality of workpieces. The parameter measurements are indicative of processing differences between the first and second workpieces. An output signal is formed corresponding to the parameter measurements and a control signal based on the output signal is used to adjust the preheating recipe for preheating the rapid thermal processing chamber for processing a second plurality of workpieces in the rapid thermal processing chamber to reduce processing differences between first and second workpieces of the second plurality of workpieces.

In accordance with another aspect of the present invention, a method of manufacturing is provided that includes preheating a rapid thermal processing chamber that has a plurality of lamps according to a preheat recipe and sequentially heating a first plurality of workpieces in the rapid thermal processing chamber. Lamp power for first, second and third workpieces of the first plurality of workpieces are measured wherein the first workpiece is the first workpiece heated and the second and third workpieces are heated after the first workpiece. A first output signal is formed corresponding to the lamp powers for the second and third workpieces, and a control signal based on the output signal is used to adjust the preheat recipe for preheating the rapid thermal processing chamber for heating a second plurality of workpieces to reduce the difference in lamp power between the first heated workpiece and a subsequently heated workpiece of the second plurality of workpieces.

In accordance with another aspect of the present invention, a method of manufacturing is provided that includes preheating a rapid thermal processing chamber that has a plurality of lamps according to a preheat recipe and sequentially heating a first plurality of workpieces in the rapid thermal processing chamber. An average lamp power for first, second and third workpieces of the first plurality of workpieces is determined wherein the first workpiece is the first workpiece heated and the second and third workpieces are heated after the first workpiece. A first output signal is formed corresponding to the average of the average lamp powers of the second and third workpieces, and a control signal based on the output signal is used to adjust the preheat recipe for preheating the rapid thermal processing chamber for heating a second plurality of workpieces to reduce the difference in average lamp power between the first heated workpiece and a subsequently heated workpiece of the second plurality of workpieces. The preheat recipe is monitored for drifts outside a preselected range.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
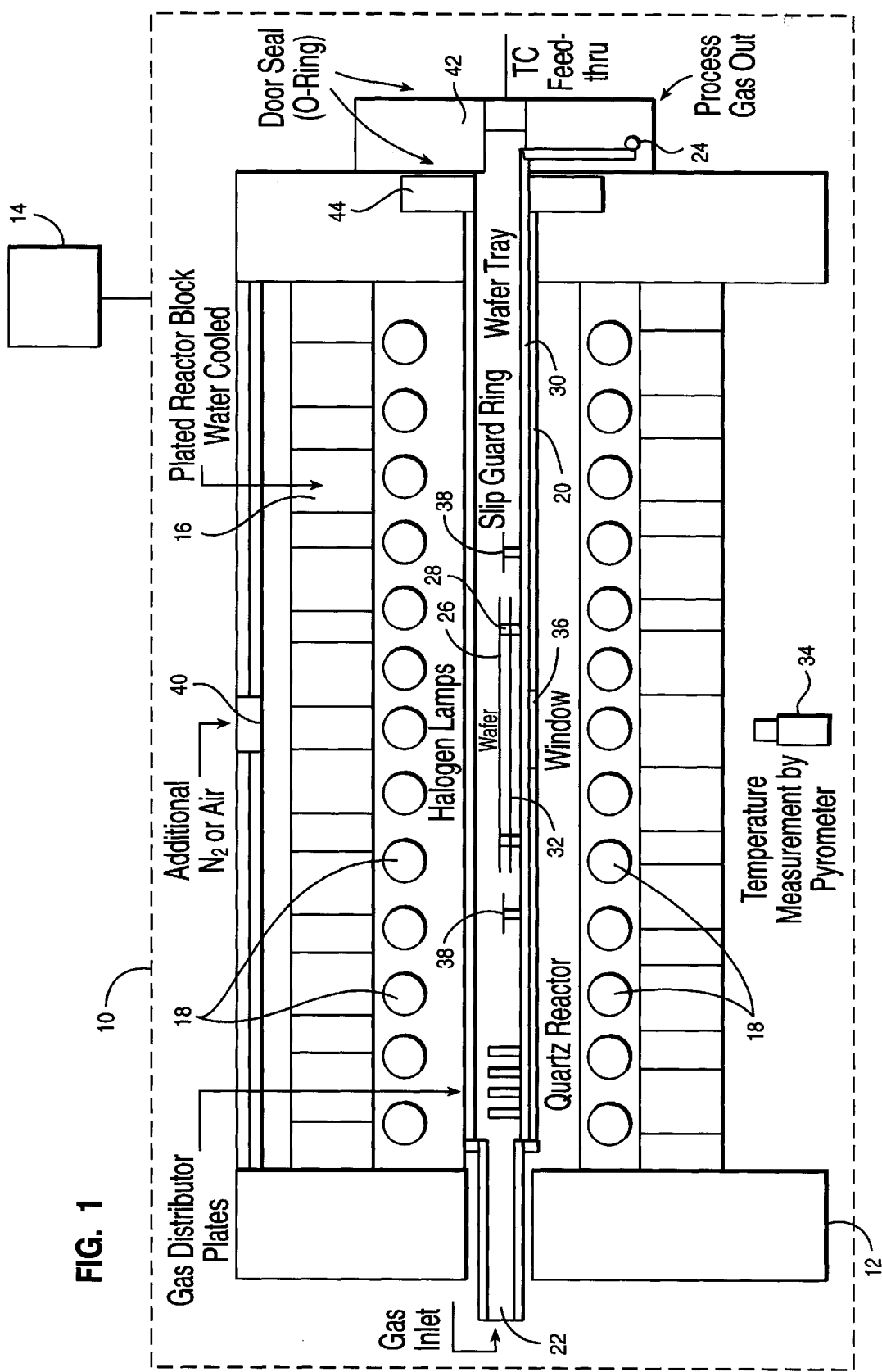
FIG. 1 is a schematic sectional view of an exemplary AST rapid thermal anneal ("RTA") tool in accordance with the present invention.

In the drawings described below, reference numerals are generally repeated where identical elements appear in more than one figure. Illustrative embodiments of a method of manufacturing in accordance with the present invention are shown in FIGS. 1–10. FIG. 1 illustrates a schematic sectional view of an exemplary AST SHS 2800 Rapid Thermal Anneal ("RTA") tool 10 (shown in dashed) (hereinafter "tool 10") that is provided with a reaction chamber 12 and a controller 14. The controller 14 may be a standard digitized proportional-integral-derivative ("PID") controller or other type of controller. The reaction chamber 12 encloses a reactor block 16 that, in turn, encloses a plurality of tungsten halogen lamps 18. The plurality of tungsten lamps 18 are positioned above and below a rectangular quartz tube 20, which is provided with a gas inlet 22 and a gas discharge 24 to enable nitrogen or a combination of nitrogen and oxygen to be passed through the tube 20 during processing. A workpiece or wafer 26 is positioned on a plurality of quartz pins 28 that are attached to a quartz wafer tray 30. A permanent wafer or Hot Liner™ 32 is positioned beneath the workpiece 26. The Hot Liner™ 32 is a silicon nitride coated silicon wafer. A pyrometer 34 is positioned beneath the quartz tube 20 in alignment with a window 36 that is aligned with the Hot Liner™ 32. The pyrometer 34 measures the temperature of the wafer 26 indirectly by reading the temperature of the Hot Liner™ 32 through the window 36. The Hot Liner™ 32 ensures that the pyrometer 34 reads a temperature from a surface with a constant emissivity. This enables emissivity independent temperature measurement and control, resulting in better consistency in workpiece processing. The Hot Liner™ 32 is surrounded by a set of guard rings 38 which are designed to extend the effective circumference of the workpiece 26 and thereby lower the radiation losses from the edges of the workpiece 26.

The reactor block 16 is water cooled. Additional cooling is provided by a supply of nitrogen or nitrogen and oxygen fed through a vent 40. The right side of the reaction chamber 12 is provided with a door 42 that is opened by the operator to insert and remove the workpiece 26. The door 42 is sealed by an O-ring assembly 44.

Figure 2:
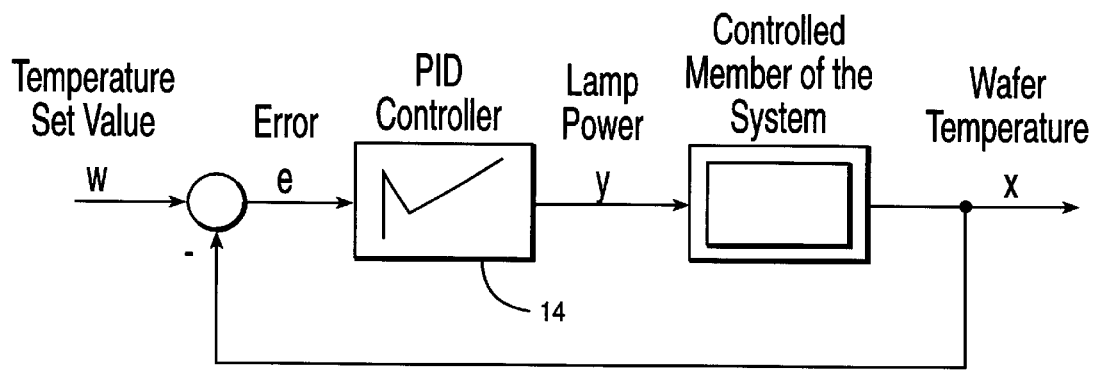
FIG. 2 is a schematic block diagram illustrating the closed loop control for the RTA tool of FIG. 1 in accordance with the present invention.
Figure 3:
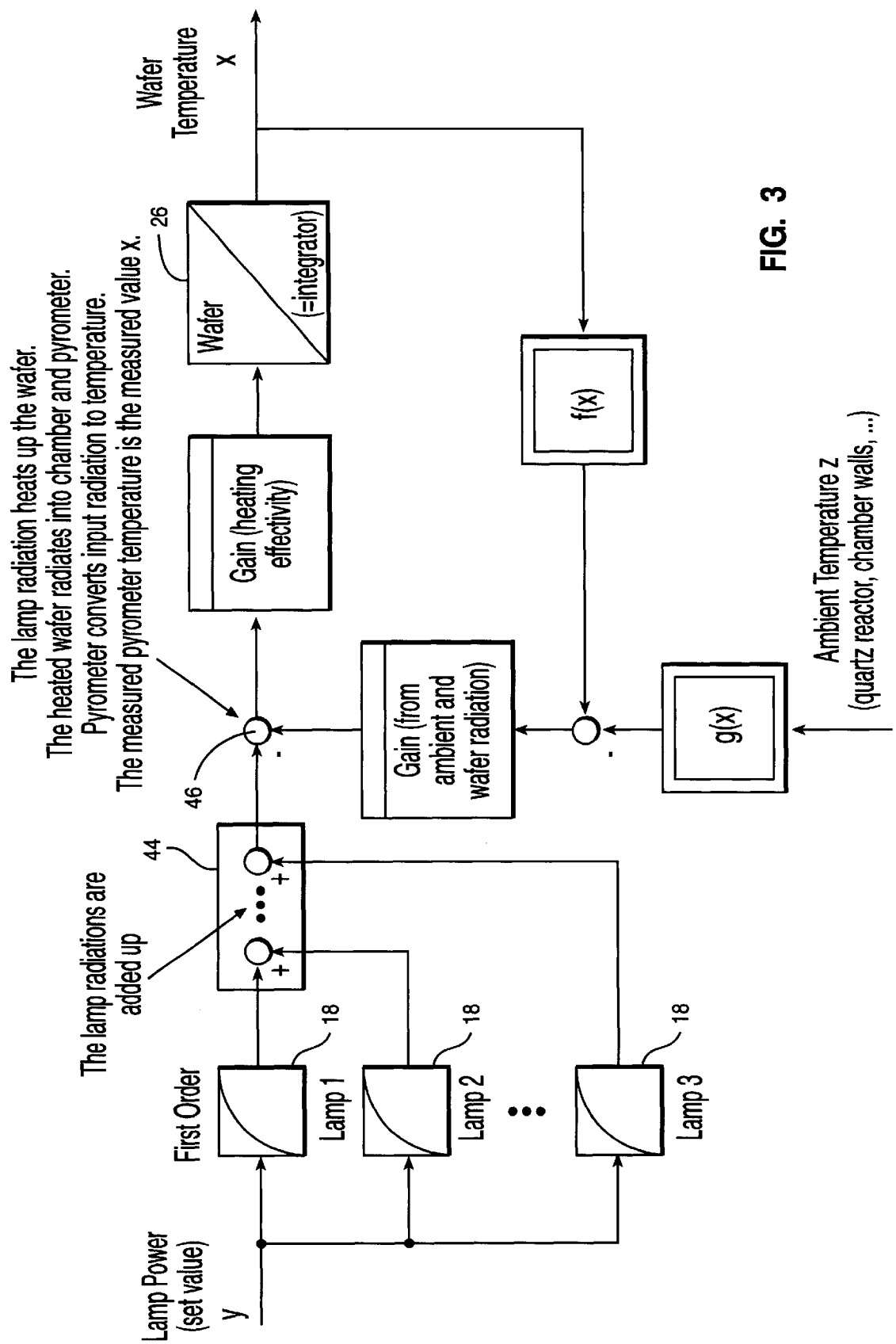
FIG. 3 is a block diagram illustrating the integration of lamp power settings and pyrometer readings for the tool of FIG. 1 in accordance with the present invention.

The basic control system for the tool 10 may be understood by referring now to FIGS. 2 and 3. FIG. 2 is a schematic block diagram depicting the closed loop control for the tool 10 and FIG. 3 is a block diagram depicting the integration of power settings of the lamps 18 and readings from the pyrometer 34. The lamp power is designated y and the temperature of the workpiece 26 is designated x. The controller 14 is designed to manipulate the lamp power y of the lamps 18 in such a way that the signal from x (the workpiece temperature measured by the pyrometer 34) tracks a desired temperature trajectory w. The controlled aspect of the system, that is, the output of the controller 14, is the set value y for the lamp power. The lamps 18 convert the lamp power signal y to radiation which heats up the workpiece 26.

The manipulation of signals to and from the lamps 18 as well as the compensation for ambient and reflected radiation may be understood by referring now to FIG. 3. The lamp power signal y is transmitted to each of the lamps 18 and the radiation outputs from each of the lamps 18 are added at the summing node 44. Because the heated workpiece 26 emits some radiation that is reflected back to the workpiece 26, the actual lamp radiation is the calculated lamp radiation minus the radiation from the workpiece 26. Thus, the gain signal 46 from the combined wafer temperature f(x) and ambient temperature g(x) (ambient temperature from the quartz reactor 20 and the walls of the reactor 12 in general) is transmitted to a summing node 46.

The control scheme described above is, of course, only useful if the controller 14 is receiving feedback from the pyrometer 34. However, the pyrometer 34 has difficulty accurately reading temperatures below about 500° C. Therefore, there are regions of the process where open loop control is used until satisfactory temperature feedback is achieved.

For manufacturing control purposes, workpieces, such as the workpiece 26 depicted in FIG. 1, are grouped into pluralities or lots. The lot size is typically twenty-five (25) workpieces 26, but may vary according to manufacturing requirements. The tool 10 is designed to individually process each workpiece of a given lot sequentially.

In accordance with the present invention, a preheat recipe on the tool 10 is designed to condition the reaction chamber 12 prior to the processing of the first work piece 26 of a given lot. The goal of the conditioning is to have the first workpiece 26 receive the same annealing process as the remaining workpieces 26 of the lot that are subsequently processed. The optimization objective is to have the power of the lamps 18 used to process the first workpiece 26 be equivalent to the lamp powers used to process later workpieces 26. That objective may be achieved by applying a run-to-run control scheme to the preheating process and making preheat recipe changes on a run-to-run or lot-to-lot basis. The adjustments to the preheat recipe are made by the controller 14. The parameter that the controller 14 adjusts is the conditional hold on the tube temperature, $T_{cutoff}$. During the preheat cycle, the lamps 18 are activated to heat the reaction chamber 12. The temperature $T_{cutoff}$ is the temperature of the quartz tube 20 at which the controller 14 shuts off the lamps 18. When $T_{cutoff}$ is reached and the lamps 18 are shut off, the preheat cycle proceeds into a finishing gas purging step, which causes the reaction chamber 12 to cool down to a temperature that is several degrees below $T_{cutoff}$, but still several degrees higher than the initial temperature of the actual annealing process.

Figure 5:
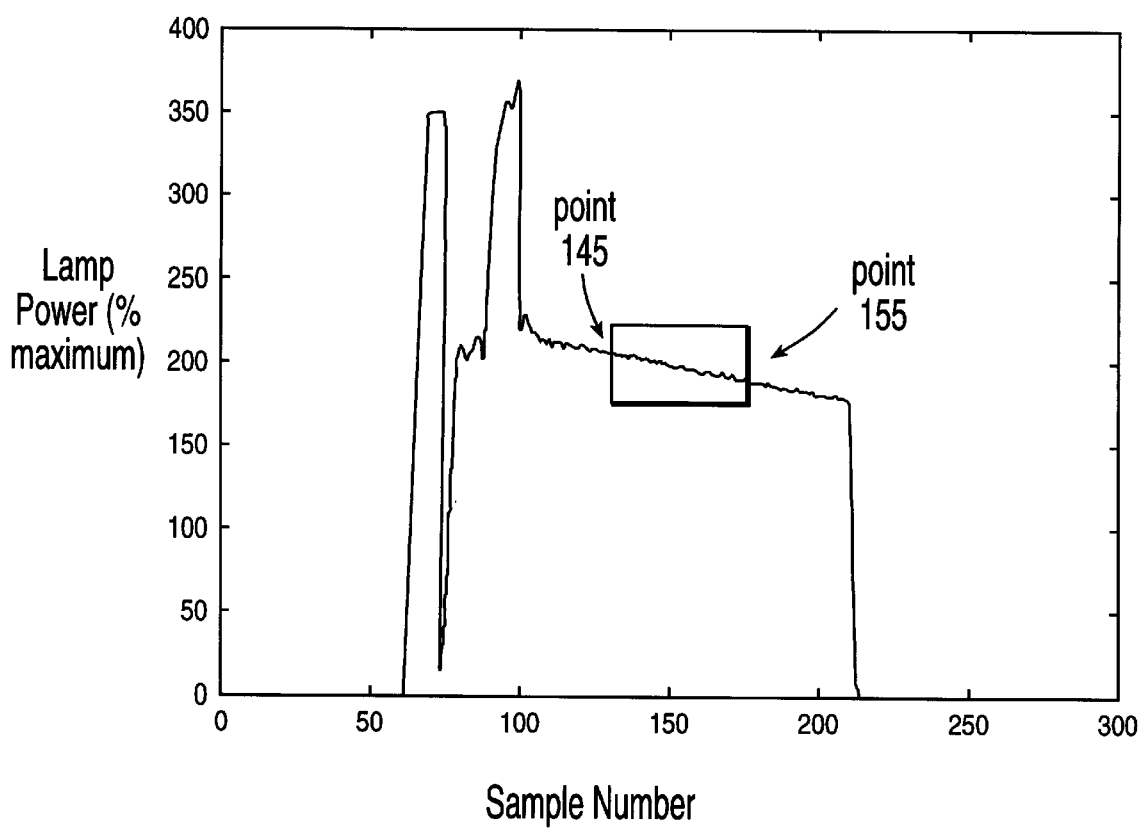
FIG. 5 is a plot of lamp power versus sample number in accordance with the present invention.
Figure 4:
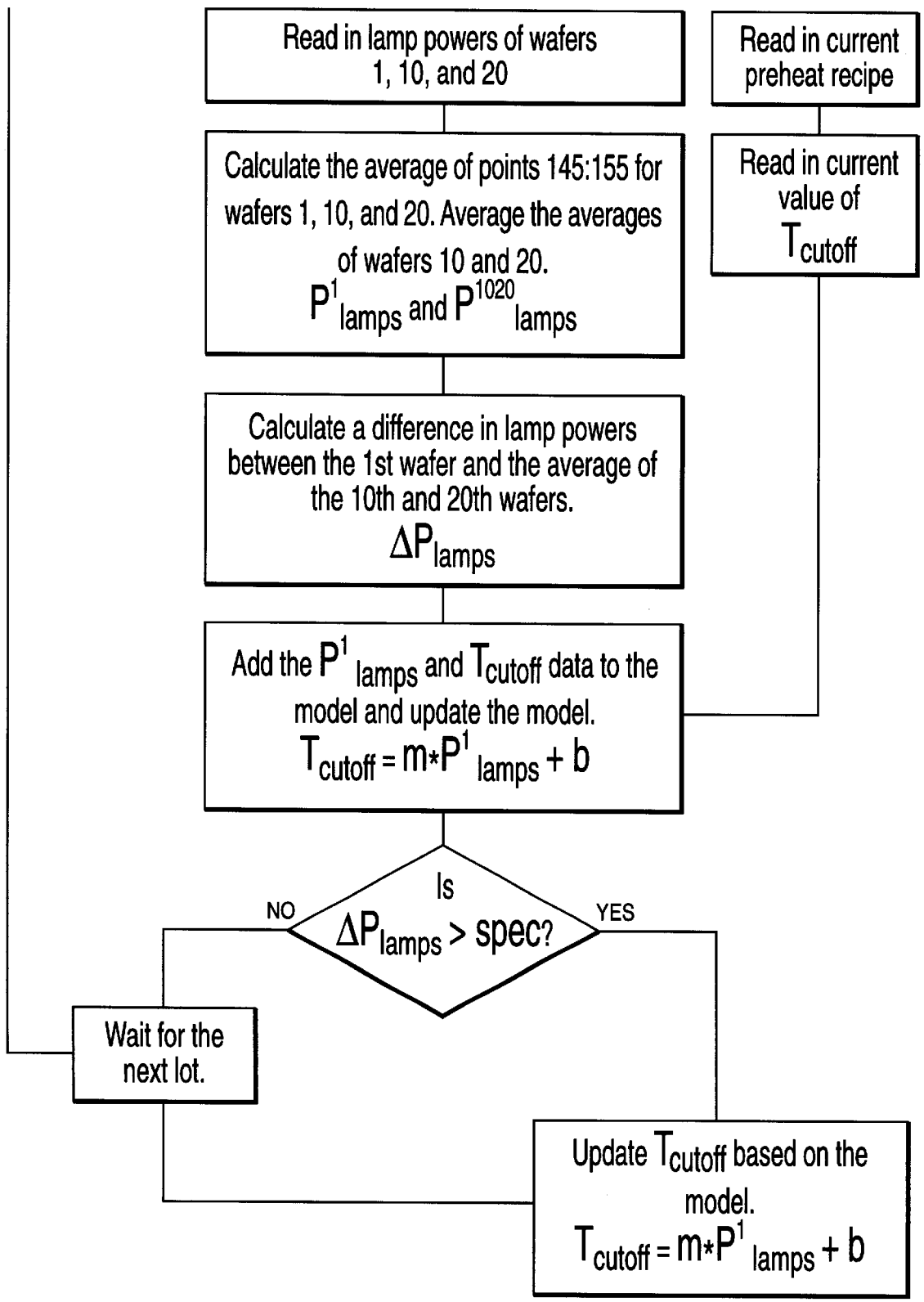
FIG. 4 is a conceptual flow chart illustrating an exemplary run-to-run control scheme in accordance with the present invention.

An exemplary process flow in accordance with the present invention may be understood by referring now to FIGS. 4 and 5. FIG. 4 is a conceptual flow chart depicting an exemplary run-to-run control scheme in accordance with the present invention and FIG. 5 is an exemplary lamp power trace for a given workpiece 26. Note that FIG. 5 is a plot of lamp power versus sample number, where the sample number is a dimensionless quantity that represents a point in time at which the lamp power applied to a given workpiece 26 is sampled. Initially, and as shown in FIG. 4, lamp power traces of the type shown in FIG. 5 are read for the $1^{st}$, $10^{th}$ and $20^{th}$ workpieces 26 of a given lot. From the lamp power traces for the $1^{st}$, $10^{th}$ and $20^{th}$ workpieces 26, the average lamp power for the first workpiece 26, $P^1_{lamps}$, and the average lamp powers for the $10^{th}$ and $20^{th}$ workpieces 26 are computed. The average lamp powers for the $1^{st}$, $10^{th}$ and $20^{th}$ workpieces 26 are determined by averaging the lamp power readings over a preselected interval of the respective lamp power traces. Although the particular sampling interval, that is, the size and number sample points n, is largely a matter of design discretion, a stable data set is desirable. Accordingly, each lamp power trace is sampled in the annealing portion thereof, which is represented by the interval between sample numbers 100 and about 210 shown in FIG. 5. In an exemplary embodiment, the average lamp powers for the $1^{st}$, $10^{th}$ and $20^{th}$ workpieces are computed by averaging the lamp power readings between sample numbers 145 and 155 shown in FIG. 5.

Referring again to FIG. 4, the average of the average lamp powers for the $10^{th}$ and $20^{th}$ workpieces, $P^{1020}_{lamps}$, is computed. A quantity $\Delta P_{lamps}$ is then calculated by computing the difference between $P^1_{lamps}$ and $P^{1020}_{lamps}$. The $P^1_{lamps}$ and initial $T_{cutoff}$ data, as well as the current preheat recipe and current value of $T_{cutoff}$ are next added to a model of $T_{cutoff}$ versus $P^1_{lamps}$ that is described in a general case by the following equation:

$$T_{cutoff} = m \cdot P^1_{lamps} + b \qquad \text{Equation 1}$$

The definition and updating of the model set forth in Equation 1 will be described more fully below in conjunction with FIGS. 6A, 6B and 7.

Following the computation of $\Delta P_{lamps}$, the controller 14 determines if the $\Delta P_{lamps}$ is greater than a preselected specified maximum value. As the skilled artisan will appreciate, it is desirable for $\Delta P_{lamps}$ to be as close to zero as possible. If $\Delta P_{lamps}$ is not greater than the desired preselected maximum, no update to the preheat recipe is made and the controller 14 and tool 10 wait for the next lot of workpieces 26. If, however, $\Delta P_{lamps}$ is greater than the specified preselected maximum, a new value for $T_{cutoff}$ is computed based on the model set forth in Equation 1. The new value $T_{cutoff}$ is then used to update the preheat recipe for the next lot of workpieces 26.

Figure 6A:
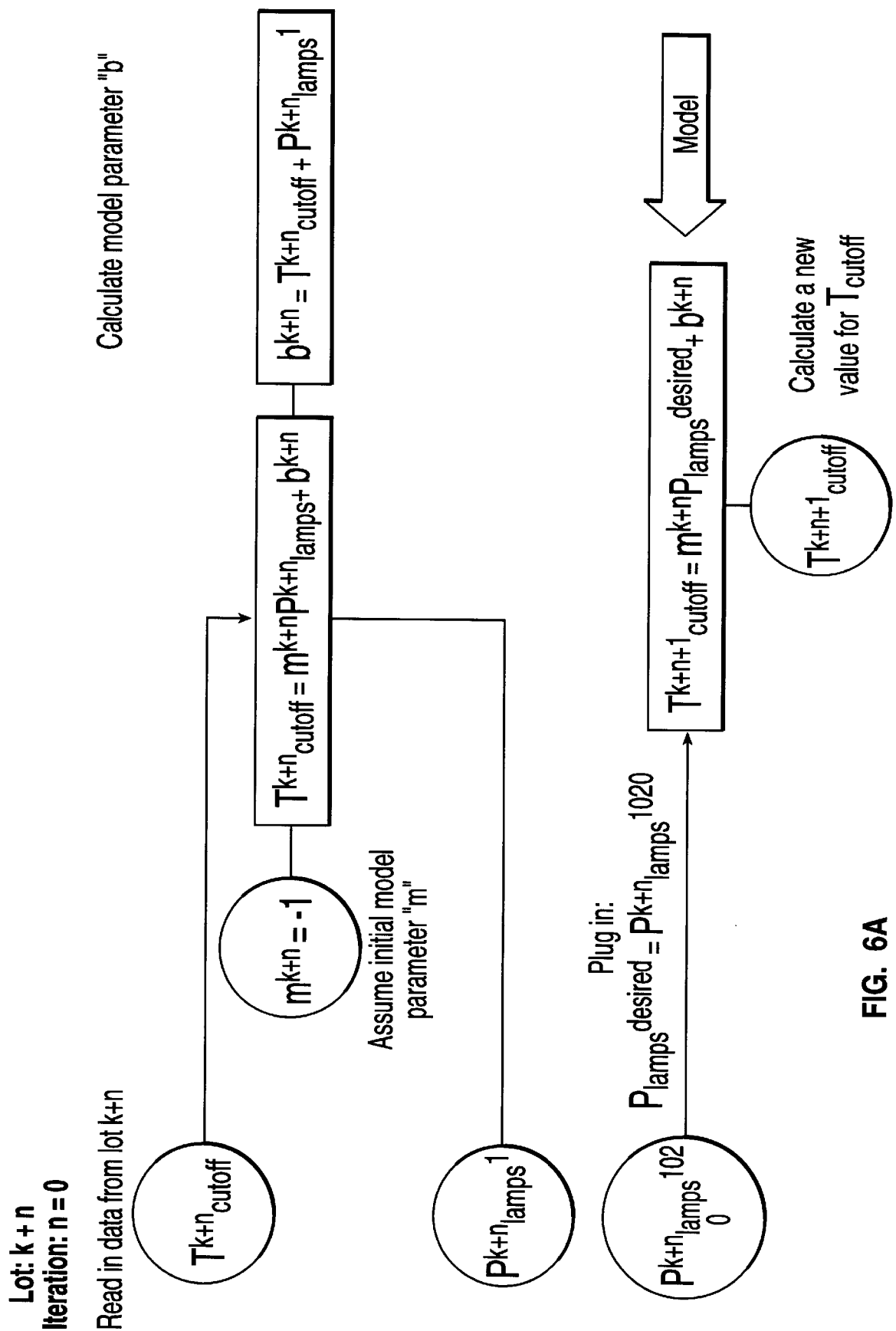
FIGS. 6A and 6B depict flow charts illustrating preheat optimization model updating in accordance with the present invention.
Figure 6B:
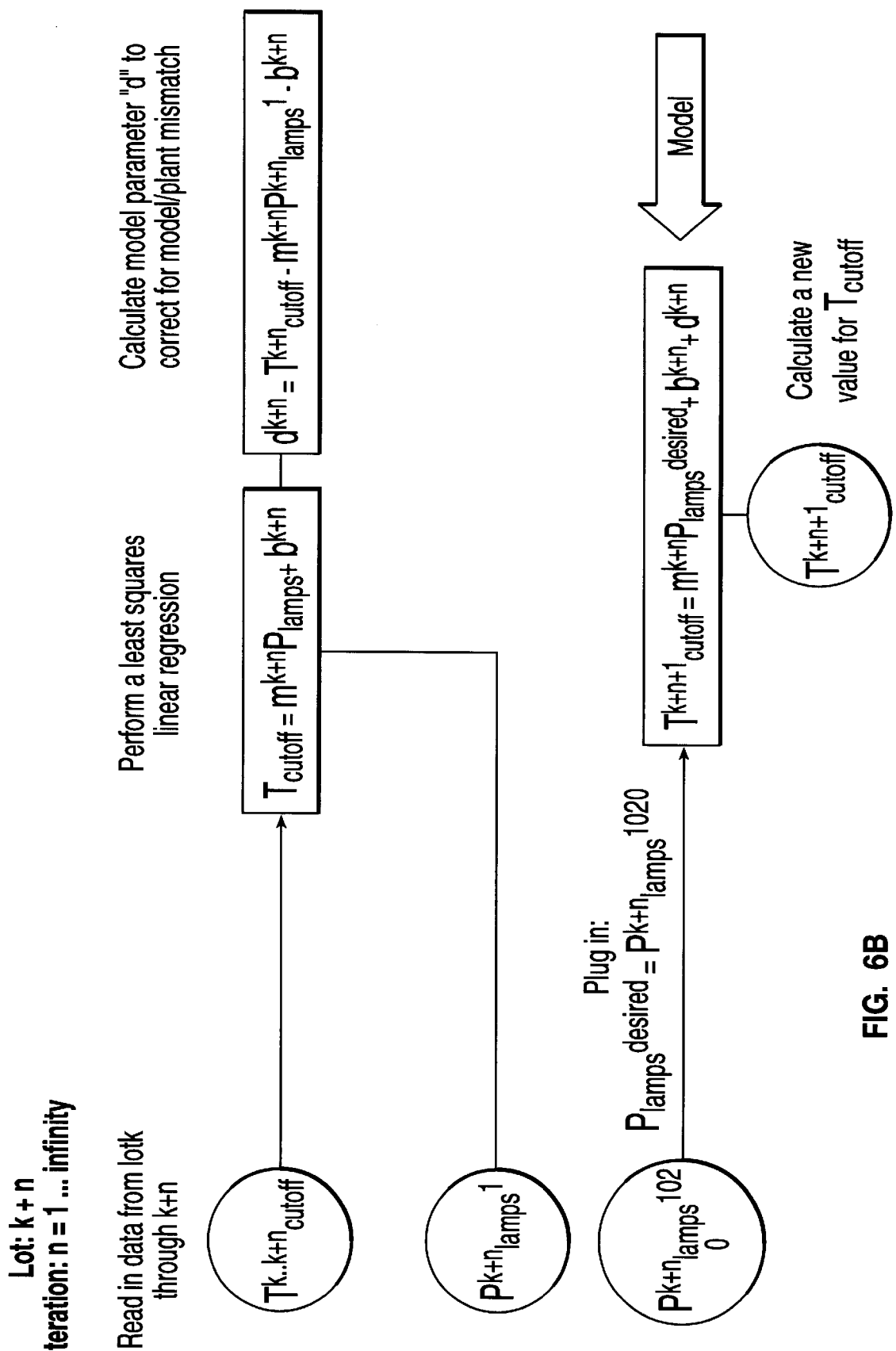
Figure 7:
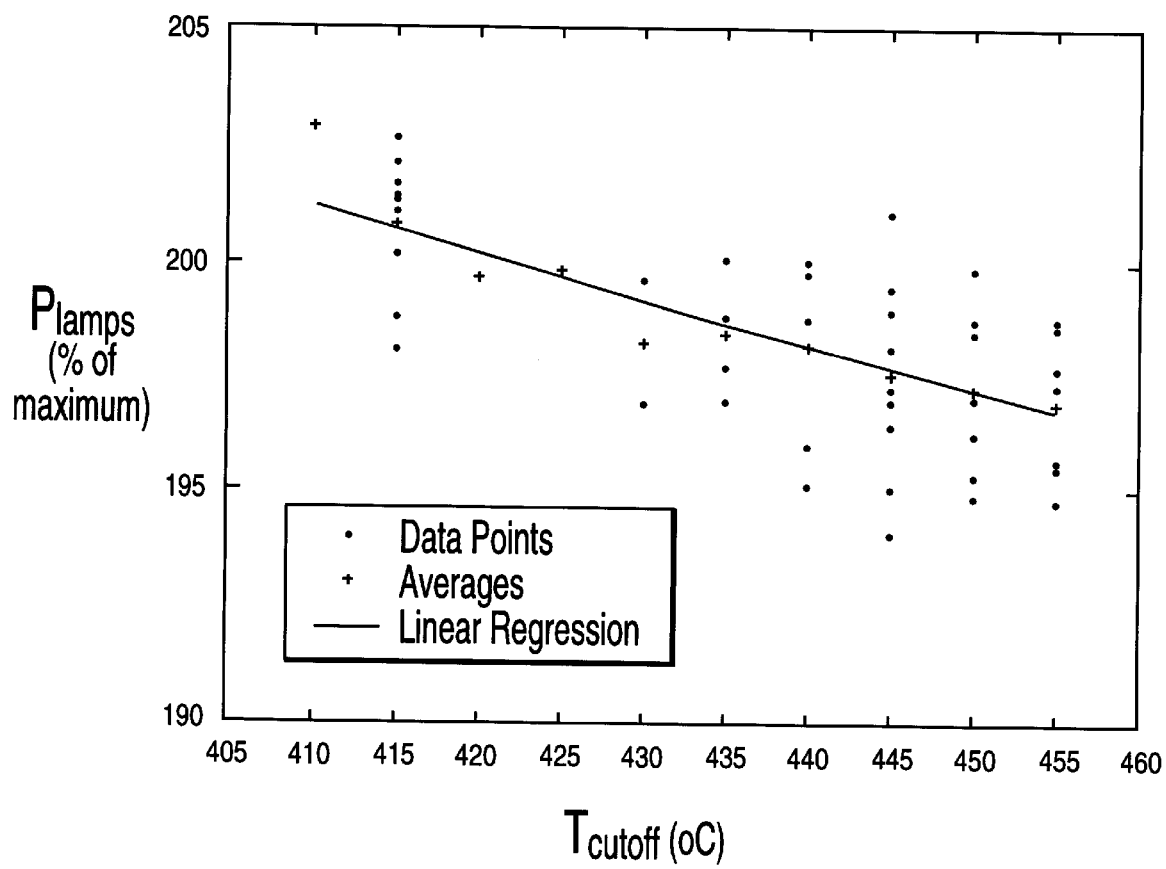
FIG. 7 is a plot of lamp power versus conditional hold temperature in accordance with the present invention.

The initial definition of the model for $T_{cutoff}$ as a function of the lamp power of the first workpiece 26 and the subsequent optimization of the model may be understood by referring now to FIGS. 6A and 6B. FIG. 6A depicts a flow chart for a hypothetical lot number k+n for an initial iteration n=0 and FIG. 6B depicts a similar flow chart for subsequent iterations for n=1 ... infinity. Referring initially to the iteration for n=0, experiment has shown that an inverse relationship exists between $T_{cutoff}$ and the average lamp power for the first wafer in a given lot, $P^1_{lamps}$. Accordingly, the initial values for conditional hold temperature ($T^{k+n}_{cutoff}$) and $P^1_{lamps}$ are used to compute a model parameter $b^{k+n}$, which is the y-intercept for the inversely proportional linear model. An initial model parameter $m^{k+n}$ is assumed to be −1 for the purpose of initially generating the model. This assumed value of −1 is based upon empirical experience. As the average of the average lamp powers for the $10^{th}$ and $20^{th}$ workpieces $P^{k+n}_{lamps}{}^{1020}$ is computed, the model as defined by the following equation is updated as shown to create a new value for conditional hold temperature, $T^{k+n+1}_{cutoff}$.

$$T^{k+n+1}_{cutoff} = m^{k+n} \cdot P_{lamps desired} + b^{k+n} \qquad \text{Equation 2}$$

Note that the new model equation includes a quantity $P_{lamps}^{desired}$. This quantity corresponds to the lamp power desired for the first wafer in a subsequent lot and is given by the average of the lamp powers for the $10^{th}$ and $20^{th}$ wafers of the initial lot. In this way, the model enables the controller 14 (See FIG. 1) to change the preheat recipe as necessary so that the first and later workpieces 26 of a subsequent lot will receive the same lamp power traces.

As shown in the flow chart in FIG. 6B for iterations n=1 ... infinity, the model is continually updated and refined during processing of subsequent lots. A least squares linear regression is performed on the data for $P^1_{lamps}$ and $T_{cutoff}$ and for each of lots k through k+n and a model parameter $d^{k+n}$ is computed and added to the model to correct for model/plant mismatch. A graphical depiction of a linear regression for an exemplary plot of $P_{lamps}{}^1$ versus $T_{cutoff}$ is illustrated in FIG. 7. The points at a given $T_{cutoff}$ reading represent the actual lamp power for that $T_{cutoff}$, whereas the plus signs represent the average of those lamp power readings at that value of $T_{cutoff}$. The linear regression curve 48 illustrates the aforementioned experimentally determined inversely proportional relationship between $P^1_{lamps}$ and $T_{cutoff}$. The updated model is provided by the following equation:

$$T^{k+n+1}_{cutoff} = m^{k+n} \cdot P_{lamps desired} + b^{k+n} + d^{k+n} \qquad \text{Equation 3}$$

Each iteration or lot results in a refinement of the model over the previous lot and an acceleration towards an optimal value. Indeed, the controller 14 utilizes an adaptive gain which allows the process model to improve as the controller 14 zeroes in on an optimal preheat recipe. In this way, the controller 14 can begin to make control moves in a direction which results in an improvement almost immediately. In an experiment, the controller 14 was able to correct a significantly sub-optimal preheat recipe in six control moves. Within the framework of these six control moves, the controller displayed integral action by suggesting control moves in a direction that is known to improve the process substantially each time. In a corollary experiment to demonstrate how the controller 14 would respond to a process shift that brings the preheat recipe outside of the optimal range, the controller 14 was tested on a sub-optimal preheat recipe where a well developed process model was already available. For this case, the controller 14 was able to bring the preheat recipe back into optimal range in only one control move. These tests thus demonstrate that the controller 14 demonstrates a fast response time and minimizes the number of work pieces 26 that are exposed to a sub-optimal process.

Figure 8A:
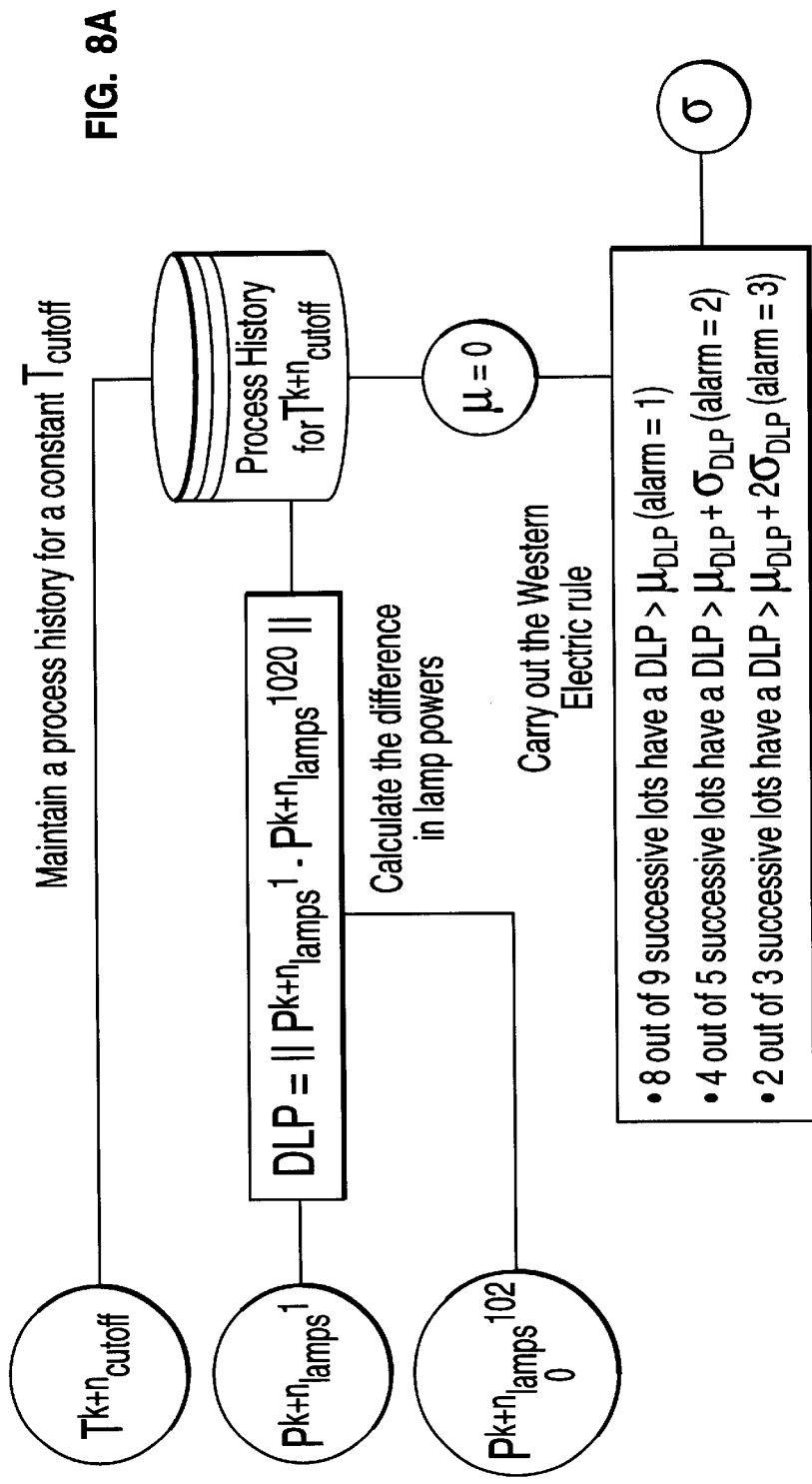
FIGS. 8A and 8B depict a block diagram illustrating a flow chart for preheat optimization process monitoring in accordance with the present invention.
Figure 8B:
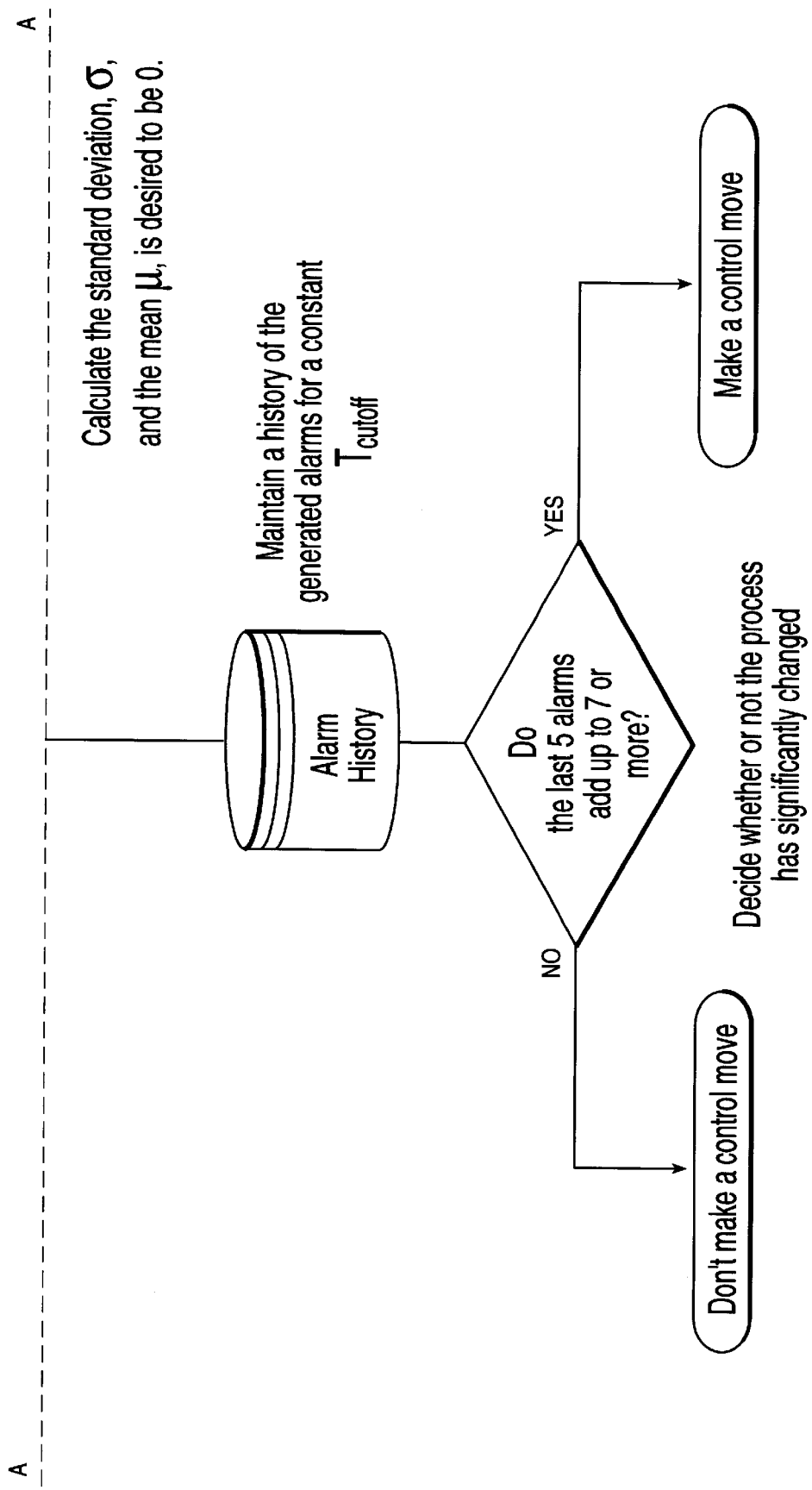

The skilled artisan will appreciate that it is desirable for the controller 14 to monitor process data for each lot for the purpose of detecting drift or shifts which may cause the preheat recipe to move outside of the optimal range. In this regard, the controller 14 is designed to find a preheat recipe that meets the objective function, that is, like annealing processes for first and subsequent work pieces in a lot, and subsequently go into a monitoring mode using a Western Electric rule to determine if drifting or shifts in the preheat recipe have occurred. If drift or shifts have occurred, then the controller 14 (See FIG. 1) makes control moves to bring the preheat recipe back into its optimal range. The controller 14 thereafter resumes drift and shift monitoring activity. A flow chart illustrating the monitoring mode is depicted in FIGS. 8A and 8B. The monitoring process is illustrated for a hypothetical lot k+n and for iterations n=1 . . . infinity. For each lot, the difference in lamp powers, DLP, is computed. The DLP quantity is the absolute value of the difference between the average lamp power for the first work piece and the average of the average lamp powers for the $10^{th}$ and $20^{th}$ workpieces 26 in a given lot. As subsequent lots are processed, a mean DLP $\mu_{DLP}$, and a standard deviation $\sigma_{DLP}$ are computed. A Western Electric rule is then carried out by comparing the DLP to the $\mu_{DLP}$ and $\sigma_{DLP}$ to generate various alarms for the purpose of prompting possible control moves to bring a deviating preheat recipe back within an optimal range.

Figure 9:
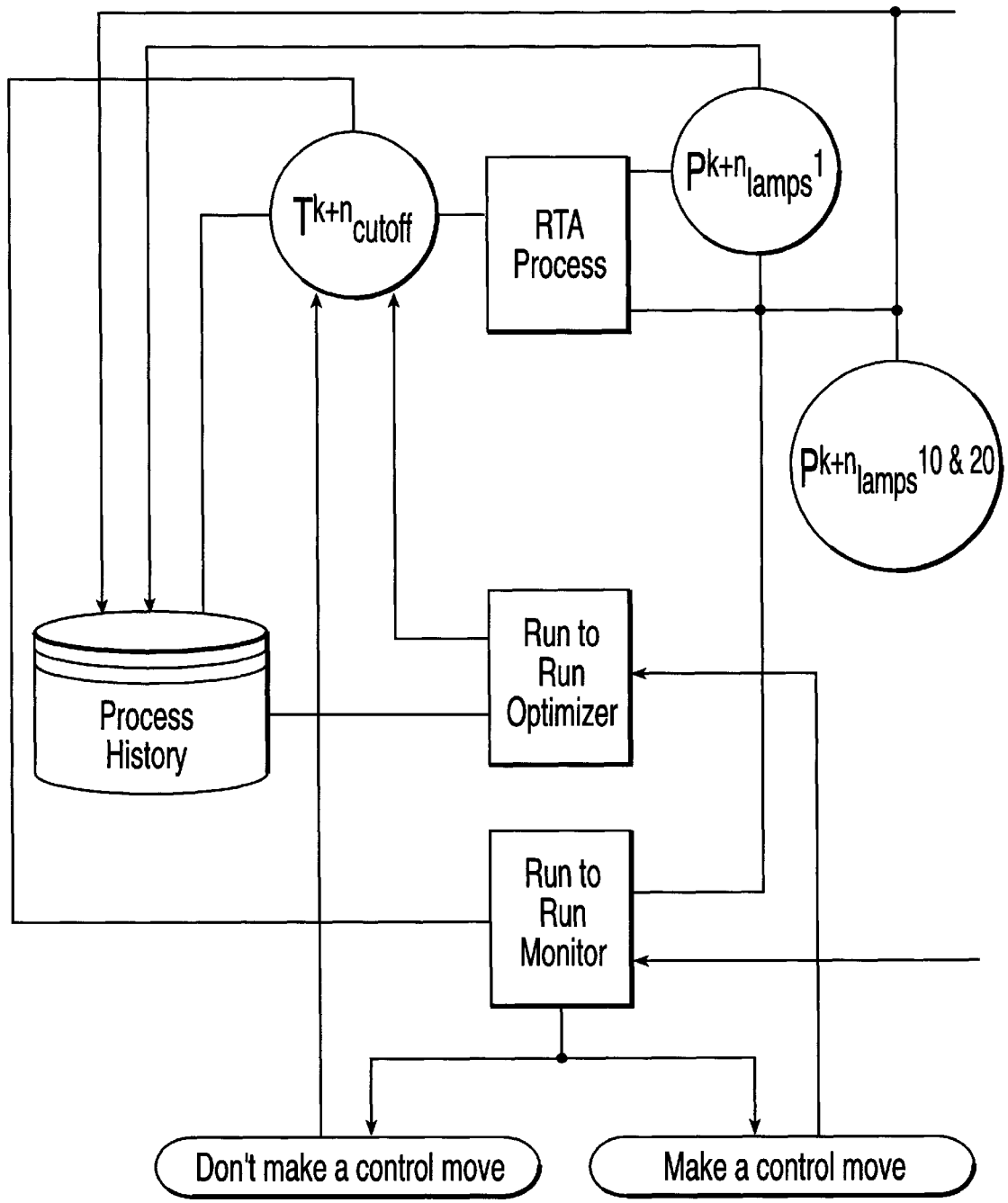
FIG. 9 is a flow chart illustrating both lot-to-lot preheat optimization and monitoring.
Figure 10A:
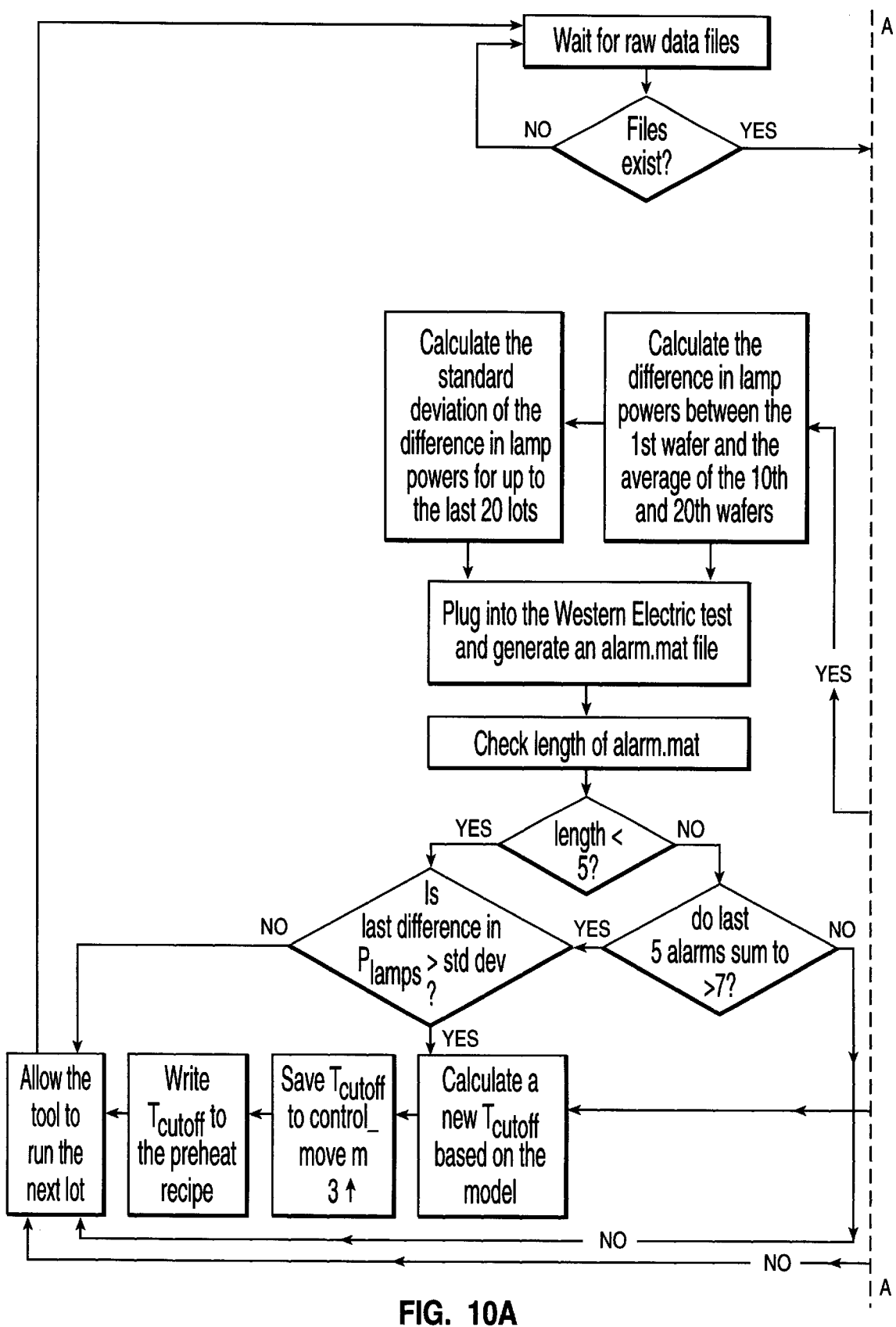
FIGS. 10A and 10B depict a control code flow chart for both lot-to-lot preheat optimization and monitoring in accordance with the present invention.
Figure 10B:
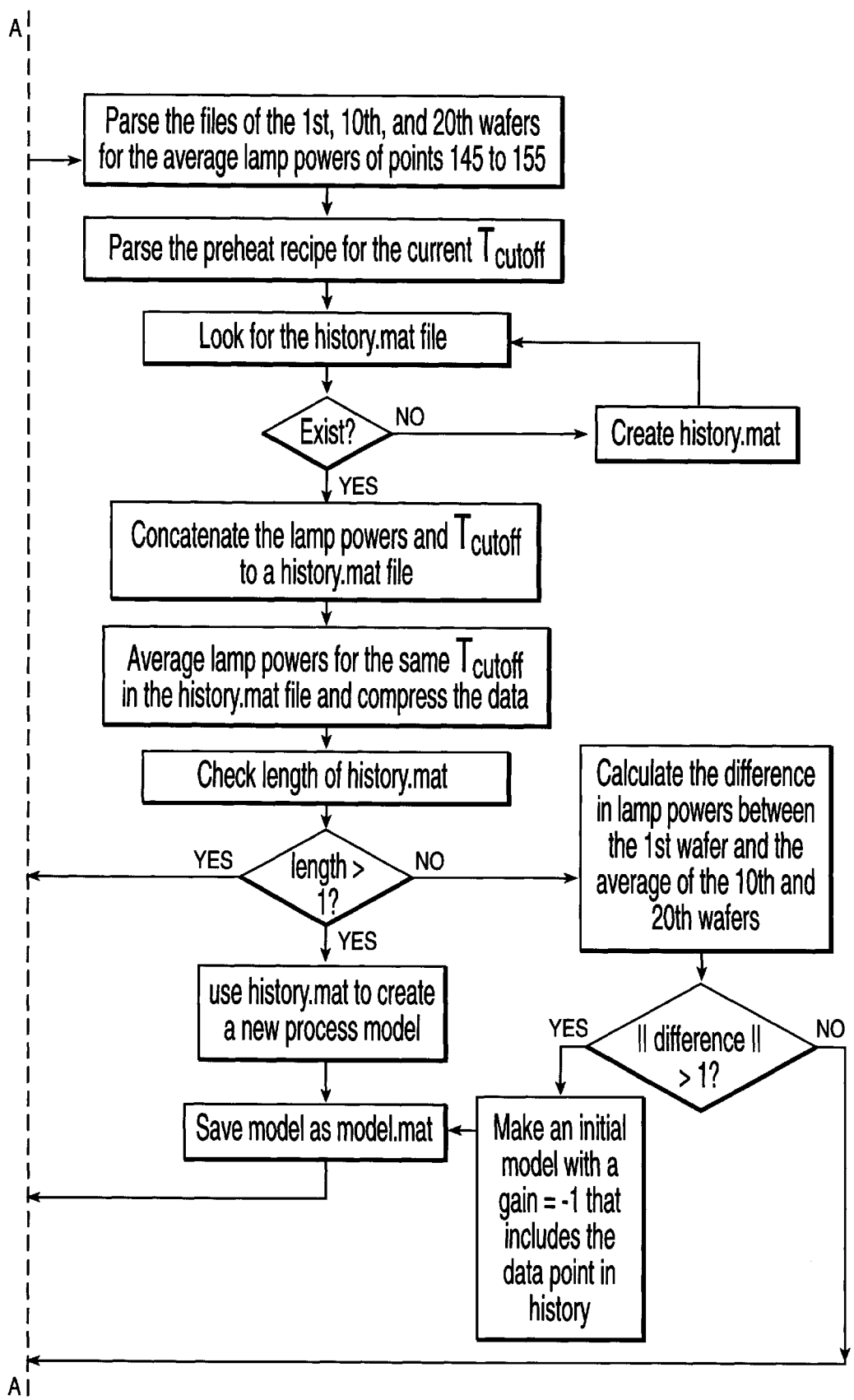

The integration of the run-to-run optimization and the run-to-run drift and shift monitoring is illustrated in the respective flow charts in FIGS. 9 and 10A and 10B. It should be understood that the drift and shift monitoring process described is intended to be illustrative. The skilled artisan will appreciate that the number and definition of alarms as well as the number of alarms necessary to trigger a control move are largely matters of design discretion. The drift and shift monitoring illustrated in FIGS. 8, 9, 10A and 10B has been coded into MATLAB® and implemented experimentally on an AST SHS 2800 RTA tool at Advanced Micro Devices, Inc.

In the foregoing illustrated embodiment, sampling of the lamp power traces is used as a means of optimizing the preheat recipe. In an alternate exemplary embodiment, a preheat recipe similar to the manufacture's recommended preheat recipe is run, however the tube temperature is overheated by a preselected amount. This overheating of the tube 20 (See FIG. 1) can be seen in the tube temperature trace of the first workpiece 26, which is much higher than the subsequent workpieces 26. This new preheat recipe is considered optimal when the lamp power trace of the first workpiece 26 closely matches the $2^{nd}$ through $25^{th}$ workpieces 26. Electrical test data from workpieces 26 run after the improved preheat recipe closely matches with data from the remaining workpieces 26 in a given lot. In other words, the first workpiece 26 has been annealed to the same extent as the rest of the lot.

In another alternate exemplary embodiment, an additional improvement to the preheat recipe can be achieved by adjusting the temperature of the preheat recipe, that is, the temperature of the hot liner 32 (see FIG. 1) as measured by the pyrometer 34, such that the reading of the pyrometer 34 at the start of the first workpiece 26 matches the readings at the start of the $2^{nd}$ through $25^{th}$ workpieces 26. This alternate embodiment provides an additional method for matching the annealing processes for the $1^{st}$ and subsequent workpieces 26 of a given lot.

In various illustrative embodiments, the process engineer may be provided with advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These capabilities may engender more optimal control of critical processing parameters, such as throughput accuracy, stability and repeatability, processing temperatures, mechanical tool parameters, and the like. This more optimal control or critical processing parameters reduces this variability. This reduction in variability manifests itself as fewer within-run disparities, fewer run-to-run disparities and fewer tool-to-tool disparities. This reduction in the number of these disparities that can propagate means fewer deviations in product quality and performance. In such illustrative embodiments of a method of manufacturing in accordance with the present invention, a monitoring and diagnostics system may be provided that monitors this variability and optimizes control of critical parameters.

Any of the above-disclosed embodiments of a method of manufacturing in accordance with the present invention enables the use of central values and spreads of RTP chamber measurements to make real-time processing tool adjustments, either manually and/or automatically, to improve and/or better control the yield. In particular, the RTP chamber measurements may include temperatures and lamp power levels that workpieces are exposed to during RTP. These RTP chamber measurements may be used to optimize the RTP chamber preheating so that, as the RTP chamber heats up during successive workpiece processing the thermal environment experienced by early workpieces will be substantially the same as the thermal environment experienced by later workpieces. In turn, this will decrease differences in workpiece processing within a lot of workpieces. Additionally, any of the above-disclosed embodiments of a method of manufacturing according to the present invention enables semiconductor device fabrication with increased reliability, increased precision, increased accuracy and increased efficiency, enabling a streamlined and simplified process flow, thereby decreasing the complexity and lowering the costs of the manufacturing process and increasing throughput.

Attached hereto as an Appendix is a Master's thesis by Glen W. Scheid, entitled "Run to Run Optimization, Monitoring, and Control on a Rapid Thermal Processor" that was submitted on May 7, 1999 to the Faculty of the Graduate School of The University of Texas at Austin, Department of Chemical Engineering, which is incorporated as a part of this disclosure as if set forth below.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of manufacturing, comprising:
   preheating a rapid thermal processing chamber according to a preheating recipe;

processing a first plurality of workpieces in the rapid thermal processing chamber;

performing parameter measurements on a first workpiece and a second workpiece of the first plurality of workpieces, the parameter measurements being indicative of processing differences between the first and second workpieces;

forming an output signal corresponding to the parameter measurements; and using a control signal based on the output signal to adjust the preheating recipe for preheating the rapid thermal processing chamber for processing a second plurality of workpieces in the rapid thermal processing chamber to reduce processing differences between first and second workpieces of the second plurality of workpieces.

2. The method of claim 1, wherein the processing of the first and second plurality of workpieces comprises heating the first and second plurality of workpieces.

3. The method of claim 1, wherein the control signal comprises a conditional hold temperature for the rapid thermal processing chamber.

4. The method of claim 3, wherein the first workpiece comprises the first workpiece of the first plurality of workpieces processed and the rapid thermal processing chamber has a plurality of lamps, the performance of parameter measurements comprises measuring the average lamp powers for the first and second workpieces.

5. The method of claim 4, comprising determining a model of the conditional hold temperature as a function of the average lamp power of the first workpiece of the first plurality of workpieces, and updating the model by inputting the average lamp power of the second workpiece to compute a conditional hold temperature for the second plurality of workpieces.

6. The method of claim 4, wherein the average lamp power of a given workpiece is determined by averaging n points of an annealing portion of a lamp power trace for that workpiece.

7. The method of claim 6, wherein the preheat recipe is adjusted to reduce the difference in temperature between the first and second workpieces of the second plurality of workpieces.

8. The method of claim 6, wherein the temperatures of the first and second workpieces is measured by a pyrometer.

9. The method of claim 3, wherein the first workpiece comprises the first workpiece of the first plurality of workpieces processed, the performance of parameter measurements comprises measuring the temperature of the first and second workpieces.

10. The method of claim 1, wherein the first and second plurality of workpieces comprise semiconductor wafers.

11. The method of claim 1, comprising monitoring the preheat recipe for drifts outside a preselected range.

12. The method of claim 11, wherein monitoring the preheat recipe for drifts outside a preselected range comprises forming a second output signal corresponding to the difference between the average lamp power of the first workpiece and the average lamp powers of the second workpiece, determining if the second output signal falls within the preselected range, and adjusting the preheat recipe to bring the second output signal for the second plurality of workpieces within the preselected range.

13. A method of manufacturing, comprising:

preheating a rapid thermal processing chamber having a plurality of lamps according to a preheat recipe;

sequentially heating a first plurality of workpieces in the rapid thermal processing chamber;

measuring lamp power for first, second and third workpieces of the first plurality of workpieces wherein the first workpiece is the first workpiece heated and the second and third workpieces are heated after the first workpiece;

forming a first output signal corresponding to the lamp powers for the second and third workpieces; and using a control signal based on the output signal to adjust the preheat recipe for preheating the rapid thermal processing chamber for heating a second plurality of workpieces to reduce the difference in lamp power between the first heated workpiece and a subsequently heated workpiece of the second plurality of workpieces.

14. The method of claim 13, wherein the lamp power for a given workpiece is an average lamp power.

15. The method of claim 14, wherein the average lamp power of a given workpiece is determined by averaging n points of an annealing portion of a lamp power trace for that workpiece.

16. The method of claim 13, wherein the control signal comprises a conditional hold temperature for the rapid thermal processing chamber.

17. The method of claim 16, comprising determining a model of the conditional hold temperature as a function of the average lamp power of the first workpiece of the first plurality of workpieces, and updating the model by inputting the average of the average lamp powers of the second and third workpieces of the first plurality of workpieces to compute a conditional hold temperature for the second plurality of workpieces.

18. The method of claim 13, wherein monitoring the preheat recipe for drifts outside a preselected range comprises forming a second output signal corresponding to the difference between the average lamp power of the first workpiece and the average of the average lamp powers of the second and third workpieces, determining if the second output signal falls within the preselected range, and adjusting the preheat recipe to bring the second output signal for the second plurality of workpieces within the preselected range.

19. The method of claim 13, wherein the first and second plurality of workpieces comprise semiconductor wafers.

20. A method of manufacturing, comprising:

preheating a rapid thermal processing chamber having a plurality of lamps according to a preheat recipe;

sequentially heating a first plurality of workpieces in the rapid thermal processing chamber;

determining an average lamp power for first, second and third workpieces of the first plurality of workpieces wherein the first workpiece is the first workpiece heated and the second and third workpieces are heated after the first workpiece;

forming a first output signal corresponding to the average of the average lamp powers of the second and third workpieces;

using a control signal based on the output signal to adjust the preheat recipe for preheating the rapid thermal processing chamber for heating a second plurality of workpieces to reduce the difference in average lamp power between the first heated workpiece and a subsequently heated workpiece of the second plurality of workpieces; and monitoring the preheat recipe for drifts outside a preselected range.

21. The method of claim 20, wherein the average lamp power of a given workpiece is determined by averaging n points of an annealing portion of a lamp power trace for that workpiece.

22. The method of claim 20, wherein the control signal comprises a conditional hold temperature for the rapid thermal processing chamber.

23. The method of claim 22, comprising determining a model of the conditional hold temperature as a function of the average lamp power of the first workpiece of the first plurality of workpieces, and updating the model by inputting the average of the average lamp powers of the second and third workpieces of the first plurality of workpieces to compute a conditional hold temperature for the second plurality of workpieces.

24. The method of claim 20, wherein monitoring the preheat recipe for drifts outside a preselected range comprises forming a second output signal corresponding to the difference between the average lamp power of the first workpiece and the average of the average lamp powers of the second and third workpieces, determining if the second output signal falls within the preselected range, and adjusting the preheat recipe to bring the second output signal for the second plurality of workpieces within the preselected range.

25. The method of claim 20, wherein the first and second plurality of workpieces comprise semiconductor wafers.

* * * * *